United States Patent [19]

Bryer et al.

[11] Patent Number: 5,089,920
[45] Date of Patent: Feb. 18, 1992

[54] LOADER MECHANISM FOR TAPE CARTRIDGE SYSTEMS

[75] Inventors: Philip S. Bryer, Tarzana; James V. Tierney, III, Costa Mesa, both of Calif.

[73] Assignee: WangDAT, Inc., Costa Mesa, Calif.

[21] Appl. No.: 435,726

[22] Filed: Nov. 13, 1989

[51] Int. Cl.$^5$ .............................................. G11B 15/68
[52] U.S. Cl. ............................................................ 360/92
[58] Field of Search .......................................... 360/92

[56] References Cited

U.S. PATENT DOCUMENTS

| | | | |
|---|---|---|---|
| 2,941,738 | 6/1960 | Burke et al | 242/55.12 |
| 2,941,739 | 6/1960 | Burke et al. | 242/55.12 |
| 3,659,857 | 5/1972 | Marcinkus | 274/4 F |
| 3,860,964 | 1/1975 | Kozu et al. | 360/92 |
| 3,869,722 | 3/1975 | Iwasaki | 360/92 |
| 4,233,638 | 11/1980 | Bolick, Jr. et al. | 360/92 |
| 4,386,382 | 5/1983 | Cutler et al, | 360/92 |
| 4,594,042 | 6/1986 | Hoffman | 414/32 |
| 4,636,888 | 1/1987 | Sidebottom | 360/92 |
| 4,802,035 | 1/1989 | Ohtsuka | 360/92 |
| 4,910,619 | 3/1990 | Suzuki et al. | 360/92 |
| 4,918,548 | 4/1990 | O'Donnell et al. | 360/92 |
| 4,937,690 | 6/1990 | Yamashita et al. | 360/92 |

Primary Examiner—Robert S. Tupper
Attorney, Agent, or Firm—Merchant, Gould, Smith, Edell, Welter & Schmidt

[57] ABSTRACT

A data transfer system using cassettes with a tape drive is configured with a number of removable cassettes stored in front to rear alignment adjacent one side (e.g. the bottom) of the tape drive. Cassettes in a removable cassette tray in a magazine are disposed in two levels, and shifted between entry and exit regions of the cassette tray after each successive cassette is derived from the tape drive and a new one is supplied. A transporter moves the individual cassette between the cassette tray and the tape drive. Advantageously, this system is configured to fit into the form factor of a standard height enclosure, with a high density DAT format tape drive occupying the upper half and the cassette tray and magazine occupying the lower half.

41 Claims, 6 Drawing Sheets

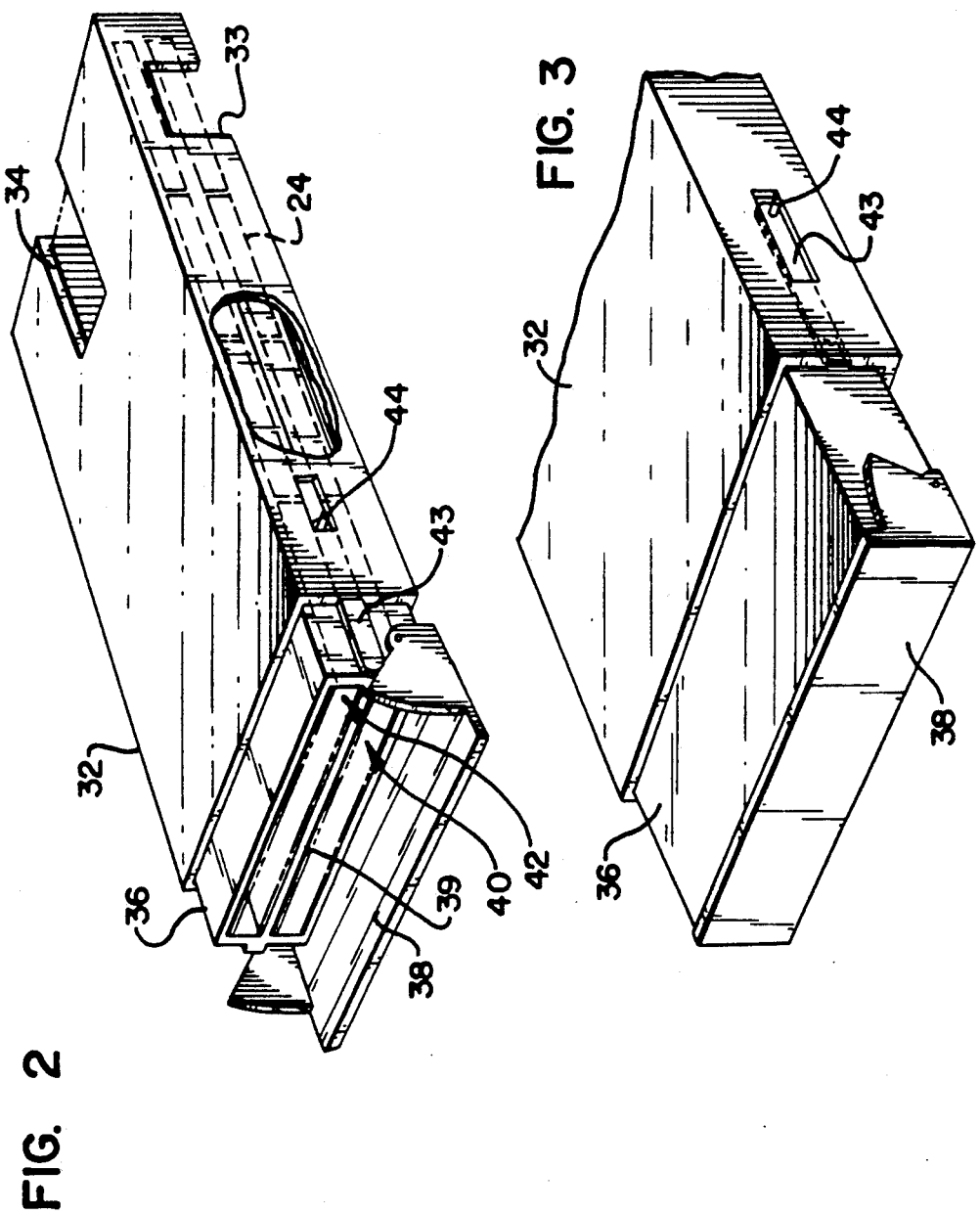

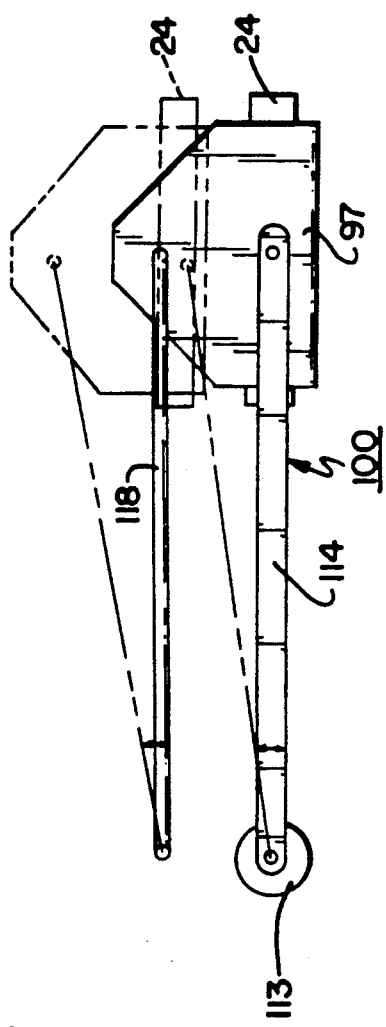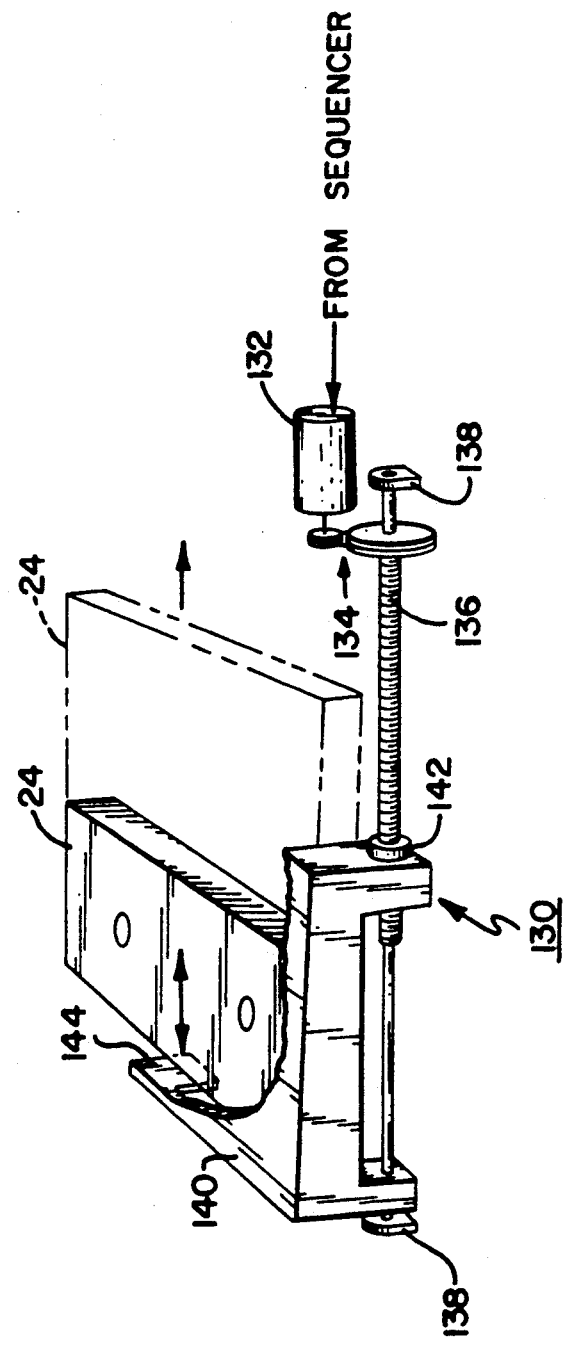
FIG. 7
FIG. 8

LOADER MECHANISM FOR TAPE CARTRIDGE SYSTEMS

BACKGROUND OF THE INVENTION

This invention relates to systems for storing large quantities of data in digital audio tape (DAT) or other format, and more particularly to such systems utilizing an automatic loader mechanism.

Magnetic tape storage devices are widely used for the storage of large amounts of digital data, because they provide an economical and reliable means for temporary and permanent storage. Because magnetic tape systems inherently rely on serial recording, access times are substantially longer than other modern storage devices, but at the same time the danger of catastrophic failure is virtually absent. Thus it has become common practice to utilize tape systems as data backup for floppy disk and hard disk files, typically by reading out the entire contents of a random access memory system at the end of the day or other operating period, and retaining this data in storage until the next backup date or time. Where the volume of data is limited, one tape system and tape reel or cartridge may suffice, but where the data base is much larger, many reels or cartridges may be needed. To utilize a backup system efficiently, it is preferred to record the backup data at a high data transfer rate during what would normally be down time for the system, e.g. the time between the close of business one evening and the start of business the next morning.

Tape drive systems have evolved over the recent past with technical improvements that have resulted in substantial increases in capacity accompanied by significant decreases in size. Large self-contained tape transports using parallel track recording techniques and relatively wide tape have been used, but these are incompatible in size, cost and power requirements with the compact and highly efficient central processor units and disk drives that are now employed. Threading of tape in reel-to-reel devices has always been a cumbersome task, so that efficient tape cassette and cartridge systems have been generated, using longitudinal scan recording techniques. By improvements in recording techniques and efficient cartridge configurations, these tape drives have been made in geometries and with sizes suitable for utilization with a standard peripheral equipment slot in a console, such as the full height slot for receiving a 5¼" floppy disk drive.

More recently, helical scan recording techniques originally devised for video recording have been adapted in compact systems to provide high density, high fidelity, digital audio tape recordings. The DAT format has in turn been adapted, under the so-called Sony/Hewlett-Packard standard, to digital data processing applications. The cassette (sometimes also called a cartridge) used for these applications is very small, the standard 4 mm digital audio cassette being 0.39" (10 mm) in height by 2.1" (54 mm) in depth, with a nominal tape width of 0.15" (3.81 mm). The recording technique used is group code encoding with error correcting codes, to the "DDS" specification X3B5/88-185A. "DDS" is a trademark of Hewlett-Packard/Sony. Using helical scan technology and 61K bpi linear density, each cassette has a data capacity of 1.3 Gbytes so that at a sustained transfer rate of 183 Kbytes/sec (burst transfer rate of 4.0 Mbytes/sec.) there is a capacity for receiving 2.2 hours of data, equivalent to the contents of two large 650 Mbyte disk drives. Large commercial organizations, however, may have many such drives, in a data base system. Consequently large main frame and parallel processors need to use many backup cassettes, even in the DAT format. It is preferable to utilize a single drive to prepare a number of tape records in sequence, rather than to employ a number of drives in parallel. This is not only more costly but less efficient. Thus stacker-type loaders have been considered that fit on the front of the console in which the tape drive is mounted, as add-on units, to provide a handler for the cassettes. This approach is unsatisfactory for aesthetic, safety and technical reasons, and is often unusable simply because of the location of the tape drive unit, since there is usually inadequate clearance available relative to other parts of the computer console.

SUMMARY OF THE INVENTION

A cassette loading system for tape drives comprises a tape drive unit having a flat broad surface on one side, typically the upper or lower side, and a cassette storage and circulating advance mechanism adjacent the flat broad side, together with a transporter for shifting cassettes between entry and exit level openings in the cassette storage mechanism and a loading door of the tape drive unit. The arrangement is preferably utilized with a tape storage system using cassettes and recording and reproducing in the DAT format, such as a streaming tape drive for backup of random access memories.

In a preferred example, the, space in a standard height enclosure, such as used for a 5¼" storage device, is occupied by a DAT drive unit of less than full height, and an adjacent magazine assembly in the space within the enclosure, to fully utilize the available form factor. The magazine assembly includes both a removable cassette tray and internal adjacent mechanisms which move the cassettes within the tray. The tray is a two level structure which comprises an exit level guideway superimposed above an entry level guideway, both disposed parallel to the front to rear axis of the tape drive. At the front of the unit, a vertical transporter, which includes means for shifting a single cassette laterally in the front-rear direction, is positioned to transfer cassettes received from the tape drive to the entry level of the magazine assembly, and to supply cassettes received from the exit level of the magazine assembly to the loading door of the tape drive. With this arrangement, a completely self-contained unit can be mounted within a standardized form factor of enclosure in a processor console, to enable many hours of high density storage in the DAT format. Furthermore, cassette trays can be inserted into and removed from the magazine assembly as desired. On a practical basis, this enables data transfer to take place substantially continuously with operator intervention required only slightly more than once a day to change the cassette trays.

In a more specific example of a mechanism in accordance with the invention, the vertical transporter for shifting cassettes is mounted to span from the front loading door region of the tape drive to the magazine assembly. The transporter includes a vertically movable cassette holder along with a lateral drive mechanism which can impel cassettes either into the tape drive or magazine assembly, and remove partially ejected cassettes. The magazine assembly is disposed within an enclosure and comprises a cassette holder into which a slidably removable cassette tray having a front-rear array of slidable at two levels. The cassette holder and tray include access apertures through which a rearwardly mounted lifter may shift cassettes from the a lower entry level to a higher exit level. The magazine assembly also comprises a separately actuable advancing mechanism insertable into the cartridge tray for advancing cassettes at the exit level toward the cassette holder on the transporter. The cassette holder about the tray includes a side-coupled rack engageable by an adjacent mechanism to draw the cassette tray into a fully inserted position.

BRIEF DESCRIPTION OF THE DRAWINGS

A better understanding of the invention may be had by reference to the following description, taken in conjunction with the accompanying drawings, in which:

FIG. 2 is a perspective view, partially broken away, of a multicassette tray and cassette holder for use in the system of FIG. 1 showing cassettes in phantom;

FIG. 3 is a perspective view of a cassette tray as in FIG. 2;

FIG. 7 is a side fragmentary view of the lifter mechanism of FIG. 6 showing alternate positions of operation;

FIG. 8 is a perspective view, partially broken away, of a cassette advancing mechanism used in the system of FIGS. 1 and 4.

DETAILED DESCRIPTION OF THE INVENTION

Figure 1:
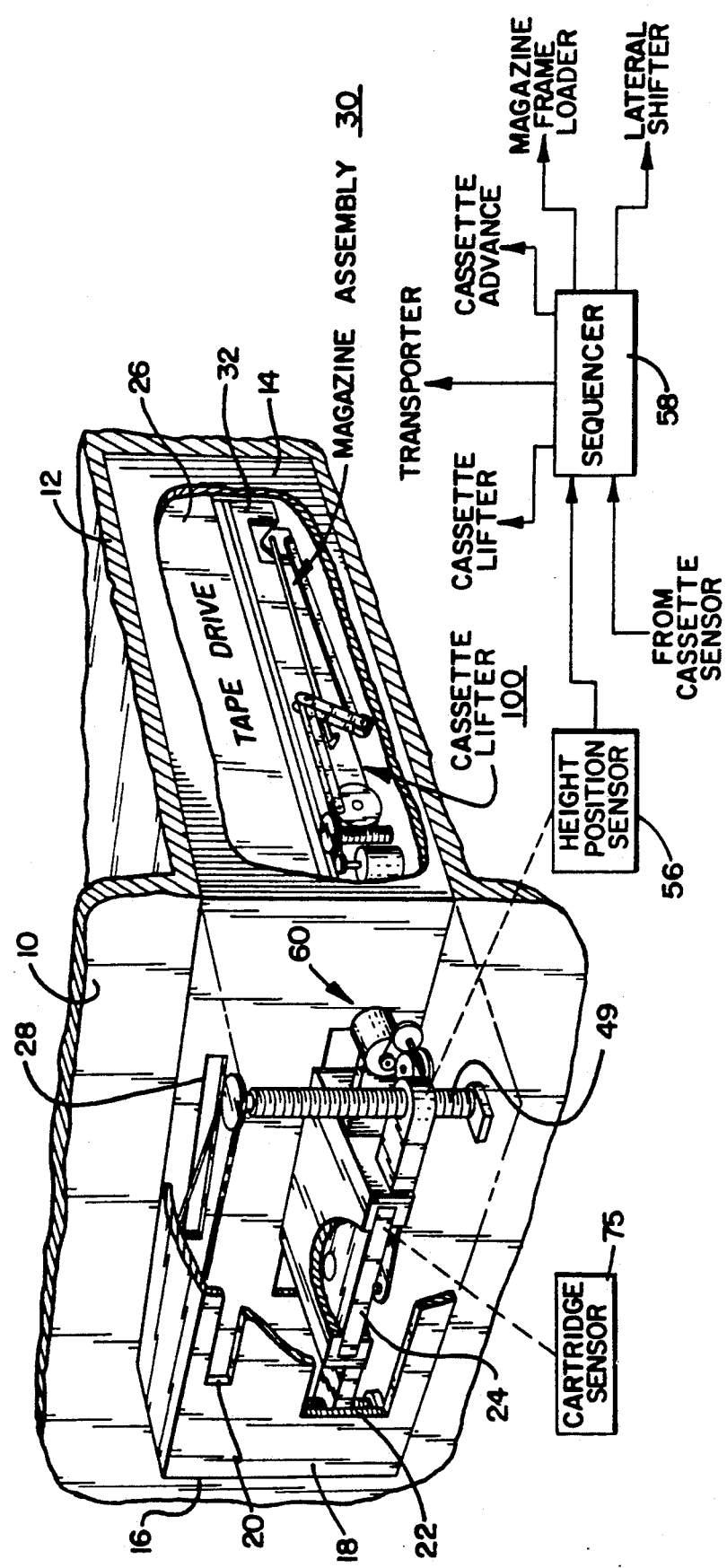
FIG. 1 is a perspective view, partially broken away, of a tape drive system with automatic loader mechanism in accordance with the invention.

A system in accordance with the invention is described as used in conjunction with a data processing system having a console 10, such as one which has a standard 5.25" full height enclosure 12. The standard 5.25" full height enclosure, for receiving tape drives, floppy disk drives and other peripheral equipment units, has a height of 3.25", a depth of 8" and a width of 5.75". The invention is described in conjunction with DAT drives, inasmuch as there is a particular need for an automatic loader in this environment, in order to enable very large quantities of data to be recorded without a need for operator attendance. However, the concepts of the invention are applicable, as will be apparent to those skilled in the art, in a number of other environments and applications.

A tape drive and loader housing 14 containing devices in accordance with the invention and having a front to rear axis is fitted into the standard height enclosure 12, filling the available volume and including a front extension 16 having a bezel 18. The bezel 18 includes a single cassette door 20 in an upper position and a magazine door 22 for receiving a multicassette magazine as described below. Hinging door covers and lock mechanisms may be of the usual form and are not shown for simplicity. An interlock system may be provided so that the doors cannot be opened when a cartridge is loaded and operating.

Figure 4:
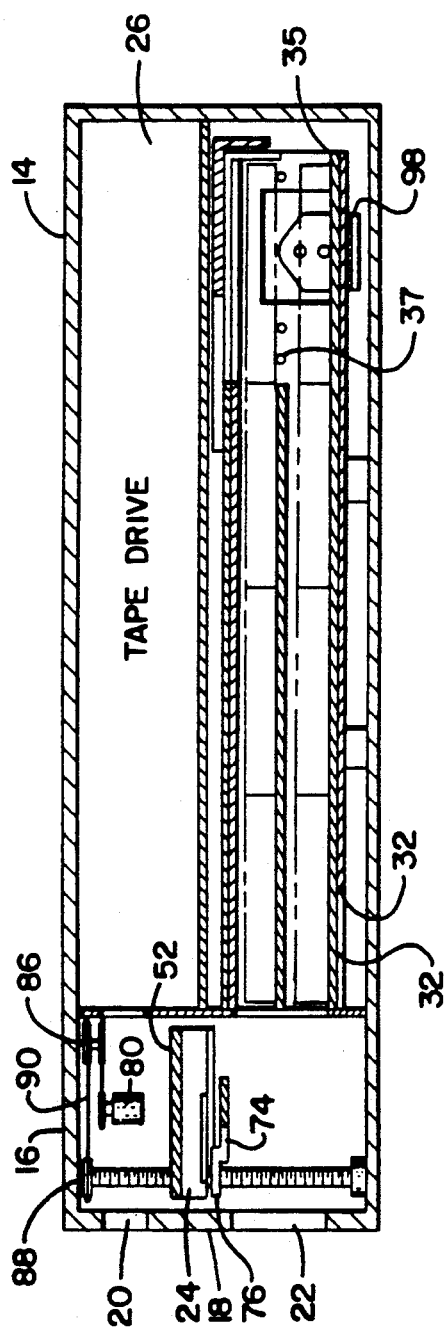
FIG. 4 is a side sectional view of the system of FIG. 1.

In FIGS. 1 and 4 a cassette 24 is shown at an intermediate position, not one of the operating positions, in order to show some of the operative structure more clearly. Within the housing 14, a tape drive unit 26 is disposed in the upper portion. The tape drive unit 26 is a DAT half-height unit, such as is available as the Model 1300 of WangDAT Inc. of Costa Mesa, Calif. A front door 28 on the tape drive unit 26 is in alignment with the single cassette door 20 in the bezel 18. The internal mechanism of the tape drive unit 26, which includes recording and reproducing circuits, servo drives, controller functions and cassette handling elements is not described inasmuch as these features are in the commercially available product. The principal items to note as far as the storage and loader system is concerned, are that a partially inserted cassette 24 is thereafter drawn into operative position and, when data transfer is complete, the cassette is ejected sufficiently to be accessible to an exterior withdrawal mechanism.

The lower portion of the housing 14 is occupied by a magazine assembly 30, also of half-height relative to the standard height enclosure 12, and comprising a number of mechanisms adjacent a magazine frame 32 of rectangular form within the enclosure 12. As best seen in FIGS. 2 and 3 the magazine frame 32 is slidably movable on underlying rails (not shown) or other low friction support between limits in the front-rear direction. The magazine frame 32 includes an open front end, side cutouts 33 adjacent the rearward end, and a top slot 34 open to the rear end. A removable cassette tray 36 is insertable from the front via the magazine door 22 in the bezel 18, through the front extension 16 into the open front end of the magazine frame 32. The cassette tray 36 includes a swingable front door 38, which is open when the cassette tray 36 and magazine frame 32 are fully inserted, the open position being shown in FIG. 2 and the closed position in FIG. 3. The cassette tray 36 is divided into upper and lower internal storage areas for cassettes, by a central horizontal plate 39. In this example the cassette tray holds four cassettes in each level, this being determined by the depth of the enclosure 12. As seen in FIG. 4, the plate 39 extends rearwardly three cassette lengths from the front, and spring loaded detents 37 in the side walls hold the fourth (rearmost) cassette 24 in the upper level. A central web 35 or strip is used in the center of the bottom level, to hold the rearmost cassette while permitting lifters at the side to raise the cassette, as described below. The lower cassette level may be said to have an entry aperture 40 at the door end, while the upper level has an exit aperture 42, these levels being utilized in circulation of cassettes into and out of the cassette tray 36. The swing door 38 is operated by a slide rod 43 coupled to a pin 44 extending through a slot in the side of the holder 32. The pin 44 engages a fixed stop (not shown in detail) in the adjacent structure when the magazine frame 32 and cassette tray 36 are fully inserted, so that the door 38 is automatically opened. Further details are not shown inasmuch as a wide variety of other automatic door opening mechanisms are known in the cassette art and various ones may be used for this function.

The mechanisms for circulating cassettes within the magazine are also a part of the magazine assembly 30, but are mounted within the lower half of the standard height enclosure, external to the magazine frame 32, although they have access to the interior cassettes. These are described in greater detail hereafter.

Figure 5:
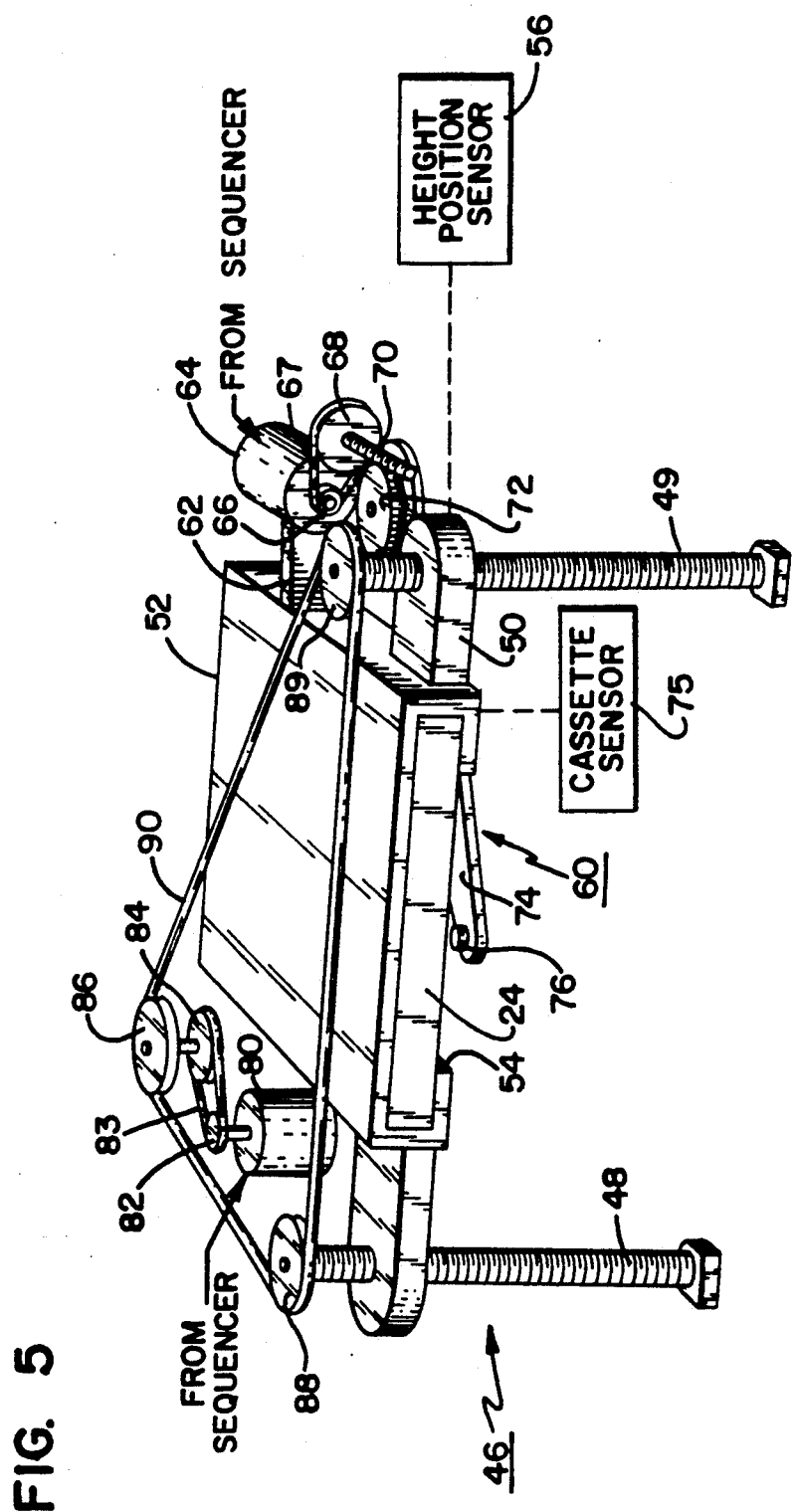
FIG. 5 is a perspective view, partially broken away, of a vertical and lateral transporter mechanism used in the system of FIGS. 1 and 2.

A transporter mechanism 46, best seen in FIGS. 1 and 5, is disposed in the front extension 16 of the housing 14, so as to span the single cassette door 20 and cassette door 22. This mechanism 46 enables insertion of a single cassette directly into the tape drive 26, or alternatively a full cassette tray 36 containing multiple cassettes 24. It also transfers cassettes to and from the tape drive unit 26 and the cassette tray 36. The transporter mechanism 46 includes a pair of vertical lead screws 48, 49, one on each side of the loader housing 14, spaced so as to permit unrestricted passage of a cassette tray 36 between the lead screws 48, 49. The lead screws support and drive a transverse carriage 50 which includes a central rectangular cassette holder 52 that is in alignment with the single cassette door 20 and the front door 28 in the tape drive 26 when the holder is in the same horizontal plane as those doors. The cassette holder 52 has an open gap in its bottom region, a cassette 24 on the holder 52 thus being engageable from its underside for movement laterally in the front to rear direction. A position sensor 56 detecting the height of the cassette holder 52 on the lead screws 48, 49 provides signals to a sequencer 58, which controls this and other mechanisms in the system. The specific form of sensor used is not shown in detail, inasmuch as optical sensor elements, electromechanical sensor elements, a vertical scale, or an incremental motor with pulse counting may be used for this purpose. The sequencer 58 may be a microprocessor or a specialized control circuit for operating the various mechanisms in proper order and in various modes. A microprocessor system is preferred because stepper motors can then be incremented directly between limits of motion. Most of the movements are strictly repetitive, and only limited actions responsive to sensors are involved. The use of a microprocessor enables other functions to be added.

The transporter mechanism 46 incorporates a lateral shifter 60 for moving single cassettes into and out of the tape drive unit 26 and the cassette tray 36. The lateral shifter 60 is mounted, including its drive unit, on a bracket 62 on the cassette holder 52. A drive motor 64 for the shifter 60 is coupled via a drive pulley 66 and belt 67 to a driven pulley 68 which operates a worm gear 70 driving a toothed wheel 72. The wheel 72 controls a swing arm 74 that extends radially toward the cassette 24 on the cassette holder 52. The swing arm 74 is angularly movable in opposite senses of rotation between predetermined arcs, under control of the motor 64. An engagement pin 76 at the end of the swing arm registers against specific points on the cassette 24, to move the cassette in the frontward or rearward direction, as needed. When a cassette 24 is to be fed in the pin 76 registers against the front lower edge, and the spring arm 74 moves the cassette rearwardly for an appropriate distance. A cassette sensor system 75 detects the direction from which a cassette 24 enters the holder 52 and when the cartridge is centered. A number of expedients, such as an array of photosensitive elements, can be used for this purpose to provide signals to the sequencer 58. Thus a detailed example is not given, in the interest of brevity.

When the cassette 24 is to be moved out the engagement pin 76 (FIG. 5) engages a standard depending lip along the front edge of the cassette 24, to move the cassette out to a desired position.

The lead screws 48, 49 are driven by a means mounted in the upper portion of the front extension 16. A lead screw drive motor 80 along one wall of the front extension is coupled by a drive pulley 82, belt 83 and driven pulley 84 to an elevator drive pulley 86 which is positioned in the plane above the door 28 on the tape drive unit 26. Lead screw pulleys 88, 89 coupled to the lead screws 48, 49 respectively, lie in the same plane as to the elevator drive pulley 86 and are driven in common by an elevator drive belt 90 in response to actuation of the motor 80 by the sequencer 58.

Figure 6:
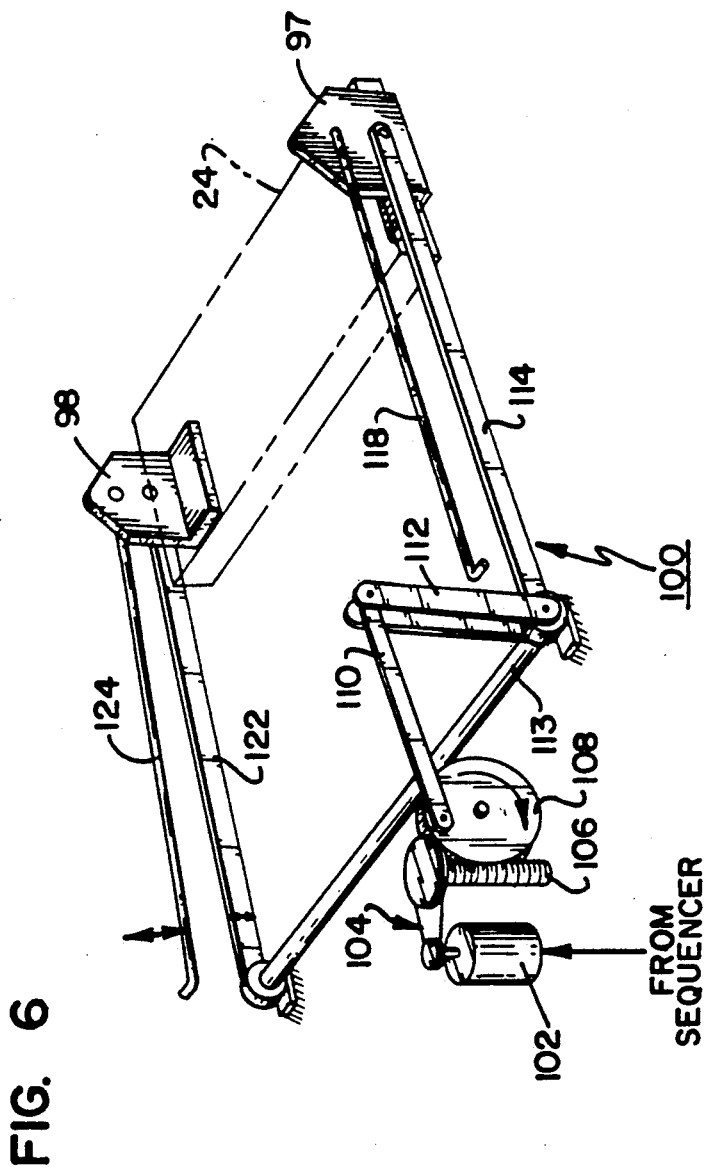
FIG. 6 is a perspective fragmentary view of a cassette lifter mechanism utilized in the system of FIGS. 1 and 4.

At the rear of the fully inserted magazine frame 32, in line with and adjacent the cutouts 33, are separately disposed a pair of L angle lifter brackets 97, 98 respectively, with the bases of the L angles facing inwardly to fit under the magazine frame 32 in the rest position. In this position they are clear of the magazine frame 32 and cassette tray 36 as they are inserted. When raised, the lifter brackets 97, 98 engage the opposite edges of a cassette, as seen in FIGS. 6 and 7, to shift the cassette from the lower level to the upper level. For this purpose, the cassette lifter mechanism 100 is mounted in the enclosure outside the magazine frame 32 on each side thereof. A lifter motor 102 is coupled by a pulley drive 104 to a worm gear 106 that is rotatable about a vertical axis, and engages the periphery of a wheel gear 108, to which one end of a drive arm 110 is pivotally coupled. The drive arm 110 is pivotably coupled to a double arm 112, the other end of which rotates a transverse pivot shaft 113 rotating about a fixed axis. The shaft 113 extends across the width of, and underneath, the magazine frame 32. A lifter arm 114, which is coupled to and pivots with the shaft 113, extends rearwardly to the lifter bracket 97, being pivotally engaged thereto at a lower position. A substantially parallel rod 118 is mounted to pivot at its forward end about a fixed axis adjacent the pivot axis of the shaft 113. At its rearward end the rod 118 is coupled so as to pivot in an upper position on the lifter bracket 97. These elements complete a four bar linkage structure that maintains the lifter bracket 97 horizontal as it is raised or lowered by action of the lifter arm 114, as best seen in FIG. 7.

On the opposite side of the magazine frame 32, the transverse pivot shaft 113 actuates a second lifter arm 122, which together with a second parallel rod 124 controls the lifter bracket 98 on that side in similar fashion.

The lifter brackets 97, 98 are normally, during the wait period, at their lowermost position, until, when a cassette 24 is pushed in the entry aperture 40, the innermost cassette is fed toward the open rear end of the cassette tray 36, to rest above the lifter brackets 97, 98. After the cassette is raised to the upper level, a cassette advance mechanism 130 moves the row of cassettes at the upper level, forcing the frontmost cartridge out the exit aperture 42.

The cassette advance mechanism 130 (FIG. 8) is mounted in the housing 14 on the opposite side from the cassette lifter mechanism 100. The mechanism 130 includes a drive motor 132 having its axis of rotation parallel to the front to rear direction, and coupled by a pulley drive 134 to rotate a lead screw 136 that is rotatable within end mounts 138 in the enclosure. A slidable panel 140 having a lead screw seat 142 engaged with the lead screw 136, and therefore movable along the front-rear axis when the lead screw 136 rotates, includes an end tab 144 that is in alignment with the top slot 34 on the magazine frame 32. The slidable panel 140 is, in the wait position, located at the rear of the magazine frame 32. When the motor 132 is actuated, however, the panel 140 and end tab 144 are driven forwardly, to engage the rearmost cassette on the lifter mechanism 100, and thereby advance the circulation of the cassettes. Following this action, the sequencer returns the panel 140 and end tab 144 to the wait position.

A number of guide rails (not shown in detail) are disposed below the magazine frame 32, to provide easy movement on the front-rear axis.

Figure 9:
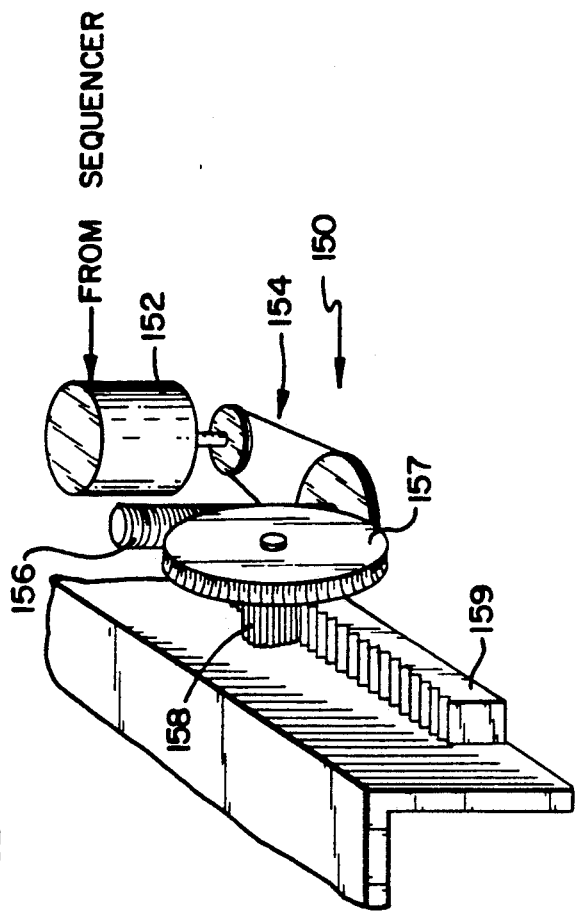
FIG. 9 is a perspective fragmentary view of an automatic insertion mechanism for the cassette holder and cassette tray.

To more readily insert and retrieve the cassette tray 36, the magazine frame 32 is driven both forwardly and rearwardly by a magazine frame drive mechanism 150 on one side of the magazine frame 32 structure, as seen in FIG. 9. A drive motor 152 is coupled by a pulley drive 154 to a vertically disposed worm gear 156, which engages the periphery of a gear wheel 157 that rotates about a horizontal axis. A pinion 158 concentric with the gear wheel 157 engages a horizontal rack 159 that is mounted on the exterior of the magazine frame 32. When the magazine frame 32 is empty, the rack 159 and coupled magazine frame 32 are driven to the forward limit by the drive motor 152. In this position, the open forward end of the magazine frame 32 is close to the magazine door 22 and the front bezel 18, so that the loaded cassette tray 36 may be fully inserted into the frame 32. Thereafter, the sequencer 58 drives the magazine frame 32 and the included tray 36 in the rearward direction until it is fully inserted, at which point the swing door 38 on the magazine is opened and the lifter brackets 97, 98 are in alignment with the cutouts 33 at the rear of the magazine frame 32.

In operation, the system circulates cassettes within the removable cassette tray 36, feeding them sequentially to and taking them from the tape drive unit 26. Each cassette 24 may thus be supplied for data transfer, received and used, then returned individually to the cassette tray 36 after which a new cassette is fed to the tape drive unit. At a sustained data transfer rate of 183 Kbytes/sec, and a capacity of 1.3 Gbytes, each cassette provides two hours of data transfer, so that nine cassettes in total give almost sixteen hours of operation. Furthermore, the mechanism enables single cassettes to be loaded into the tape drive unit individually, as well as via the cassette tray operation.

In operation, the transporter mechanism 46 is held in alignment with the upper doors 20 in the bezel 18 and tape drive unit 26 when awaiting insertion of one or more cartridges. If a single cassette is entered through the single cassette door 20, it moves into the cassette holder 52. The lateral shifter 60 is then actuated to move the cassette 24 into the tape drive unit 26 via the front door 28, to a distance sufficient for the tape drive unit to take command. Upon completion of operation the first cassette will be ejected from the tape drive 26 and returned to the cassette holder 52 for removal. At this point the lateral shifter 60 engages the standard lip on the underside of the front cartridge edge to complete movement into the holder 52.

Alternatively, a cassette tray 36 loaded with eight cassettes 24 may be entered through the magazine door 22 into the magazine frame 32. In the wait mode, the magazine frame drive 150 has shifted the magazine frame 32 toward the magazine door 22, so that the cassette tray 36 can be fully engaged in the magazine frame 32. Upon automatic sensing of the presence of the cassette tray 36, as by a microswitch (not shown) or operator actuation of a start control, the magazine frame drive 150 moves the entire cassette tray and magazine frame assembly to the rearward position, opening the cassette tray door 38 at this position. Although automatic controls can be employed, the data processing system operator will typically know how much data is to be transferred and will simply arrange for shutdown after the completion of data transfer to a given number of cassettes, with a maximum of eight.

To start the sequence of successive insertions of cassettes 24 into the tape drive 26, the transporter mechanism 46 is first positioned in line with the exit level 42 of the cassette tray 36 (FIG. 2) while the cassette-associated mechanisms are in wait mode positions. In this mode the lifter brackets 97, 98 are in the lowered position and the end tab 144 and the cartridge advance mechanism 130 are at their rearward positions. When the height position sensor 56 (FIG. 1) indicates that the cassette holder 52 is in alignment with the exit aperture 42, the sequencer 58 operates the cassette advance mechanism 130 (FIG. 8) through a cycle. In this cycle the motor 132 and coupled lead screw 136 are first driven to shift the cassette 24 in the upper level forwardly by one cassette dimension in the front-rear direction. The rear cassette thus moves to leave a gap, as the forward cassette is moved into the cassette holder 52 in the transporter 46. The lateral shifter 60 may be used for final adjustment of cassette position, by engaging the lip or acting as a stop. The cassette advance mechanism 130 then returns to its wait position.

The available, empty, cassette position at the rear of the upper level is thus available to be filled by the rear cassette in the lower row. However, this can be done during the wait period, after the transporter 46 is vertically raised to align with the tape drive door 28, by use of the sequencer 58 and height position sensor 56. When this position is reached, the swing arm 74 is rotated so that the engagement pin 76 moves the cassette 24, via its front edge, into the tape drive 26 sufficiently for the tape drive to engage and position the cassette internally. Data transfer can thus begin, and be carried out for the full capacity of the tape. In the interim the carriage advance mechanism 130 is returned to its rearward, wait mode, position and the transporter 46 is left at the tape drive level. The rearmost lower level cassette is moved to the upper level, by movement of the lifter mechanism 100 of FIGS. 6 and 7, controlled by the sequencer 58. The rearmost cassette resting on the central web 35 is lifted at its edges by the angles 97, 98, which move forward slightly but are held horizontal by the parallel arm sets 114, 118 and 122, 124 respectively. The detents 37 (FIG. 4 only) in the sides of the cassette tray 36 hold the rear cassette at the upper level, leaving an opening at the rear position of the lower level. The lifter mechanism 100 is then returned to the lower position.

When the tape drive 26 finishes data transfer with the first cassette, it is ejected, positioned in the holder 52, and the transporter 46 is lowered to align the cartridge with the entry level aperture 40 in the cassette tray 36. The cassette is then moved into the lower level, shifting prior cassettes rearwardly to fill the open gap. The transporter 46 is moved up to the exit level, a new cassette is loaded in, and the transporter inserts it in the tape drive.

This sequence is repeated with each cassette in turn, until all cassettes are filled with data via the tape drive unit 26, at which point the transporter mechanism 46 can be stopped in the upper position. The magazine frame drive 150 is operated to bring the magazine frame 32 and cassette tray 36 forwardly, so that the cassette tray 36 may be manually removed and a new one inserted.

It will be recognized that the mechanism is extremely compact, and does not require small precision parts, such as would be needed if a circulating conveyor of the chain type were to be employed. However, where space or other requirements permit, such a conveyor would be feasible.

Because the arrangement permits the entire tape drive, removable cassette tray and transporter mechanism to be self contained behind a front panel, the danger of damage is greatly lessened and the aesthetics of the construction are preserved. It will be appreciated that if the tape drive unit can be shortened in length, and a smaller or lesser number of cartridges can be used, the front protrusion may be eliminated so that the entire unit may be flush with the console in which it is mounted. Conversely, where space permits a greater number of cassettes can be used in a line.

A number of other variants also suggest themselves. The self-contained unit can be used either with an enclosure in a console, as shown, or as a stand alone unit. In the latter event an interior or separate power supply is employed. The direction of movement of cassette in the cassette tray can be changed, so that the entry level is above and the exit level below, with appropriate change of the lifter and the cassette advance mechanism. The system is useful with any tape drive that employs cassettes, whether digital, audio or video. If it is desired to load a single cassette directly into the tape drive along with a cassette tray in the storage system, two open spaces are held at the rearward position and the sequence is slightly changed. Thus a cassette returned from the tape drive is entered into the cassette tray, shifting the entry line back so that the lifter mechanism can first raise the rear cassette up and the advance mechanism can then move the upper line forwardly. Also, the magazine frame system and tape drive can be inverted so that the tape drive is below, where this is advantageous.

While a number of forms and modifications in accordance with the invention have been shown, it should be appreciated that the invention is not limited thereto but encompasses all versions and variations within the scope of the appended claims.

What is claimed is:

1. A data storage system, comprising:
   a tape drive having a front loading entrance for receiving a tape cassette, the tape drive being mounted within an enclosure substantially defining a standard peripheral form factor, wherein the enclosure comprises a single cassette loading entrance in line with the front loading entrance of the tape drive, the system further comprising means for accepting a cassette through the single cassette loading entrance, and means for loading the accepted cassette into the front loading entrance of the tape drive;
   a horizontally-oriented magazine removably disposed within the enclosure in a position adjacent the tape drive for storing a plurality of tape cassettes, wherein the cassettes reside on their broad faces therein to maintain a low profile; and
   means, adjacent both the magazine and the tape drive, for transporting cassettes between the tape drive and the magazine.

2. The invention as set forth in claim 1 above, wherein the system further comprises an extension abutting the enclosure and encompassing the means for transporting cassettes between the tape drive and the magazine.

3. The invention as set forth in claim 1 above, wherein the standard peripheral form factor comprises a 5.25 inch form factor.

4. The invention as set forth in claim 1 above, wherein the magazine comprises:
   a frame;
   a cassette tray within the frame having a lower and an upper storage area with an entry and an exit aperture, the apertures in a fully inserted magazine being aligned in a plane parallel with the front loading entrance of the tape drive;
   means for transferring cassettes between the lower and the upper storage area of the tray; and
   means for advancing cassettes from the tray to the means for transporting cassettes between the tape drive and the magazine.

5. The invention as set forth in claim 4 above, wherein the means for transferring cassettes between the lower and the upper storage area further comprises elevator means, internally disposed in a rear portion of the cassette tray, for transferring cassettes between the lower and the upper storage area of the tray.

6. The invention as set forth in claim 4 above, wherein the system further comprises:
   means, mounted in the enclosure, for driving a magazine partially inserted in the enclosure into a fully inserted position therein; and
   means, mounted in the enclosure exterior to the cassette tray and engaged within the cassette tray against a cassette therein, for advancing at least one cassette toward the exit aperture of the tray.

7. A system for storing data on a plurality of tape cassettes, comprising:
   a frame defining a standard peripheral form factor;
   a tape drive disposed within the frame and occupying a predetermined portion of the standard peripheral form factor; and
   a cassette magazine, disposed within the frame adjacent the tape drive and occupying a different portion of the standard peripheral form factor, for storing the cassettes; and
   means for interchanging the cassettes between the cassette magazine and the tape drive.

8. The invention as set forth in claim 7 above, wherein the cassette magazine can be removed from the frame.

9. The invention as set forth in claim 7 above, wherein the cassette magazine is horizontally disposed within the frame substantially parallel to the tape drive.

10. The invention as set forth in claim 7 above, wherein the cassettes reside on their broad faces in the magazine to maintain a low profile.

11. The invention as set forth in claim 7 above, wherein the system further comprises an extension abutting the frame and encompassing the means for interchanging cassettes between the tape drive and the cassette magazine.

12. The invention as set forth in claim 7 above, wherein the cassette magazine comprises:
    a magazine frame;
    a cassette tray within the magazine frame having a lower and an upper storage area with an entry and an exit aperture, the apertures being aligned in a plane parallel with the front loading entrance of the tape drive;

means, disposed adjacent to the magazine frame, for advancing cassettes from the tray to the means for interchanging cassettes between the tape drive and the magazine; and means for transferring cassettes between the lower and the upper storage area of the cassette tray.

13. The invention as set forth in claim 12 above, wherein the magazine frame further comprises a cassette tray loading entrance.

14. The invention as set forth in claim 12 above, wherein the means for transferring cassettes between the lower and the upper storage area further comprises elevator means, internally disposed in a rear portion of the cassette tray, for transferring cassettes between the lower and the upper storage area of the tray.

15. The invention as set forth in claim 12 above, wherein the system further comprises means for driving a magazine partially inserted into the frame into a fully inserted position.

16. The invention as set forth in claim 12 above, wherein the system further comprises means, mounted in the magazine frame exterior to the cassette tray and engaged within the cassette tray against a cassette therein, for advancing at least one cassette toward the exit aperture of the magazine frame.

17. A system for supplying cassettes to a tape drive, comprising:

a housing disposed within a receiving volume of a standard-size computer peripheral device, wherein the tape drive is disposed within a first portion of the housing;

a magazine, removably disposed within a second portion of the housing adjacent the tape drive, for storing the cassettes; and means for interchanging cassettes between the magazine and the tape drive.

18. The invention as set forth in claim 17 above, wherein the system further comprises an extension abutting the housing and encompassing the means for interchanging cassettes between the tape drive and the magazine.

19. The invention as set forth in claim 17 above, wherein the magazine comprises:

a frame;

a cassette tray within the frame having a lower and an upper storage area with an entry and an exit aperture, the apertures in a fully inserted tray being aligned in a plane parallel with a front loading entrance of the tape drive;

means, disposed adjacent to the frame, for advancing cassettes from the tray to the means for interchanging cassettes between the tape drive and the magazine; and means for transferring cassettes between the lower and the upper storage area of the tray.

20. The invention as set forth in claim 19 above, wherein the frame further comprises a cassette tray loading entrance.

21. The invention as set forth in claim 19 above, wherein the means for transferring cassettes between the lower and the upper storage area further comprises elevator means, internally disposed in a rear portion of the cassette tray, for transferring cassettes between the lower and the upper storage area of the tray.

22. The invention as set forth in claim 19 above, wherein the system further comprises:

means for driving a magazine partially inserted into the housing into a fully inserted position; and means, mounted in the housing exterior to the cassette tray and engaged within the cassette tray against a cassette therein, for advancing at least one cassette toward the exit aperture of the tray.

23. A data storage system, comprising:

an enclosure having a given volumetric format of a standard-size peripheral device;

a tape drive, disposed within the enclosure, for recording data on a tape cassette, the tape drive having a front loading entrance for receiving the tape cassette along a front to rear axis of the enclosure;

a horizontally-oriented magazine for storing a plurality of tape cassettes, wherein the cassettes reside on their broad faces therein to maintain a low profile, the magazine being disposed within the enclosure in a position adjacent the tape drive and substantially parallel to the front to rear axis of the enclosure; and means, adjacent the front loading entrance of the tape drive and spanning a distance to the magazine, for transporting cassettes between the tape drive and the magazine.

24. The invention as set forth in claim 23 above, further comprising a bezel spanning a plane normal to the front loading entrance of the tape drive and in front of and adjacent to means for transporting cassettes between the tape drive and the magazine, the bezel including a first aperture in an upper position in alignment with the front loading entrance of the tape drive for receiving a single cassette and a second aperture in a lower position for receiving the magazine, wherein the means for transporting cassettes between the tape drive and the magazine comprises means for directly inserting a single cassette in the tape drive via the first aperture in the bezel.

25. The invention as set forth in claim 24 above, wherein the system further comprises:

an upper and a lower storage level within the magazine defining an exit and an entry level for the cassettes respectively; and means, coupled between the lower and upper levels, for transporting the cassettes therebetween.

26. The invention as set forth in claim 25 above, wherein the means for transporting cassettes between the tape drive and the magazine comprises:

a holder device for receiving a cassette;

means, coupled to the holder device, for transporting the holder device between the entry and exit levels of the magazine and to the front loading entrance of the tape drive; and shifter means for moving the cassette laterally towards and away from the tape drive and the magazine.

27. The invention as set forth in claim 26 above, wherein the shifter means comprises a drive mounted at one side of the means for transporting the holder device and movable therewith.

28. The invention as set forth in claim 27 above, further comprising means for sensing a delivery of a cassette from the tape drive, and means, responsive to means for sensing, for positioning the cassette in a selected location within the entry and exit levels of the magazine.

29. The invention as set forth in claim 28 above, wherein the magazine further comprises:

an frame for receiving the cassette tray;

means, disposed adjacent the frame, for advancing the cassette tray into the frame;

lifter means, disposed at a rear position of the magazine, for lifting cassettes between the entry level and the exit level within the cassette tray; and means, disposed adjacent the cassette tray in an inserted position, for advancing, by one cassette dimension, cassettes in the exit level towards the means for transporting cassettes between the tape drive and the magazine, and for advancing cassettes in the entry level towards the lifter means.

30. The invention as set forth in claim 29 above, further comprising sequencer means for sequencing the means for transporting the holder device between the magazine, the tape drive, and the shifter means.

31. A system for transferring data utilizing a plurality of tape cassettes, comprising:

a DAT type tape drive, disposed within an enclosure for recording data on the cassettes;

a magazine, removably disposed within the enclosure adjacent the tape drive, wherein the cassettes, each having a broad and a narrow surface, are positioned within the magazine so that the broad surface of each cassette forms a plane parallel to the front to rear axis of the enclosure and the narrow surface forms a plane perpendicular therewith; and means, disposed adjacent the tape drive and the magazine, for transferring cassettes between the tape drive and the magazine.

32. The invention as set forth in claim 31 above, wherein the system further comprises an extension abutting the enclosure and encompassing the means for transferring cassettes between the tape drive and the cassette magazine.

33. The invention as set forth in claim 31 above, wherein the system further comprises means for accepting a single, externally supplied cassette into the tape drive.

34. A data storage system utilizing a plurality of tape cassettes, comprising:

a tape drive having a front loading entrance for accepting an individual cassette and recording data thereon; and cassette handling means, mounted adjacent the tape drive, for interchanging cassettes therewith, wherein the cassettes are arranged in rows in a removable magazine along a horizontal axis, each row containing a plurality of cassettes, each cassette having a broad and a narrow surface, wherein the cassettes are juxtaposed narrow surface to narrow surface in the rows.

35. The invention as set forth in claim 34 above, wherein the tape drive and the cassette handling means are both mounted within an enclosure defining a standard peripheral form factor.

36. A system for enabling a tape drive to effect data transfer with a plurality of cassettes, comprising:

an enclosure wherein the tape drive is mounted in a portion of the enclosure and having a loading aperture for receiving the cassettes along a first horizontal axis, wherein the enclosure further comprises a cassette loading entrance coplanar with the loading aperture of the tape drive;

means for loading a cassette through the cassette loading entrance of the enclosure into the loading aperture of the tape drive;

cassette holding means, mounted in a different portion of the enclosure from the tape drive, for storing cassettes spaced along a second horizontal axis parallel to the first horizontal axis; and means for transferring cassettes between the loading aperture of the tape drive and the cassette holding means along a third vertical axis perpendicular to the first horizontal axis and the second horizontal axis.

37. A system as set forth in claim 36 above, wherein the enclosure occupies a volumetric format of a standard peripheral form factor.

38. A system as set forth in claim 36 above, wherein the cassette holding means comprises means for circulating cassettes therein, and wherein the means for transferring cassettes comprises means for shifting cassettes between the exterior of the enclosure and the tape drive along the third axis.

39. A magazine for storing tape cassettes, comprising:

a rectangular magazine frame having an open front end and means defining an aperture in a side region and an aperture in a rear region thereof; and a rectangular cassette tray disposed within the magazine frame and including a divider therein that separates the tray into adjacent and parallel cassette paths, the divider being interrupted in a region adjacent the side region aperture in the magazine frame, and the tray including a rear wall aperture in the region adjacent the rear region aperture in the frame.

40. A magazine as set forth in claim 39 above, wherein the cassette tray retains the cassettes on their broad faces in both the cassette paths, such that the cassette tray has a low profile, and wherein the cassette tray includes a pivoted door at the front end.

41. A magazine as set forth in claim 40 above, wherein the magazine frame includes means for opening the door on the cassette tray when it is inserted, and wherein the cassette tray includes means for holding a cassette in position above the interrupted divider region.

* * * * *

UNITED STATES PATENT AND TRADEMARK OFFICE
CERTIFICATE OF CORRECTION

PATENT NO. : 5,089,920

DATED : February 18, 1992

INVENTOR(S) : Philip S. Bryer

It is certified that error appears in the above-identified patent and that said Letters Patent is hereby corrected as shown below:

Title page, item [54] and column 1, line 2, change "CARTRIDGE" to --CASSETTE--.

Column 2, line 31, change ", the," to --, the ---

Column 3, line 1, after "slideable" insert -- cassette --.

Column 1, line 24, change "cartridge" to -- cassette --.

Column 1, line 25, change "cartridges" to -- cassettes --.

Column 3, line 3, delete "the".

Column 3, line 6, change "cartridge" to -- cassette --.

Column 5, line 5, change "cassette" (second occurrence) to --magazine--.

Column 5, line 60, change "cartridge" to -- cassette --.

Column 7, line 58, change "edcge" to -- edge --.

Column 8, line 58, change "cartridge" to -- cassette --.

Column 8, line 60, change "shirting" to -- shifting --.

Column 9, line 26, change "cassette" to -- cassettes --.

Signed and Sealed this

Thirty-first Day of August, 1993

Attest:

BRUCE LEHMAN

*Attesting Officer*  *Commissioner of Patents and Trademarks*